Patented Mar. 24, 1953

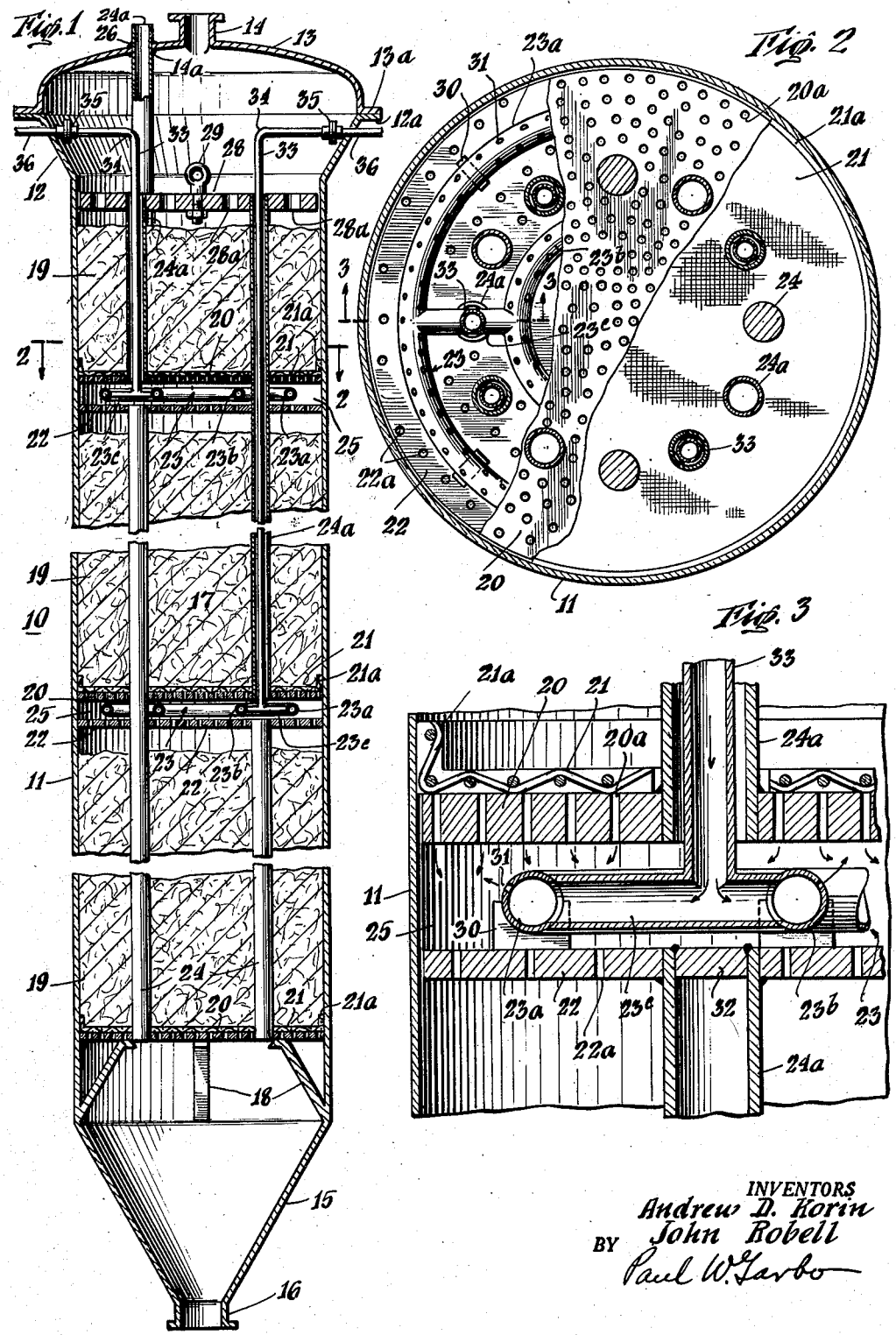

2,632,692

UNITED STATES PATENT OFFICE 2,632,692

MULTIPLE BED CATALYST APPARATUS

Andrew D. Korin, Long Island City, and John Robell, West Hempstead, N. Y., assignors to Hydrocarbon Research, Inc., New York, N. Y., a corporation of New Jersey Application January 18, 1949, Serial No. 71,484

5 Claims. (Cl. 23—288)

This invention relates to the reactions of fluids conducted in the presence of solid catalysts and more particularly to exothermic reactions conducted by passing the fluid reactants through a plurality of catalyst beds arranged in series.

Several proposals have been made for carrying out catalytic exothermic reactions of fluid reactants involving the passage of the fluid reactants through a plurality of catalyst beds arranged in series and the addition of a cooling or quenching fluid directly into the fluid stream passing from one catalyst bed to the succeeding catalyst bed. These proposals are based on a type of operation directed to the control of the exothermic reaction which is fundamentally simple and from several technical points of view attractive. However, all prior efforts to apply these proposals on a commercial scale have resulted in fairly complicated procedures and forms of apparatus to permit their execution.

A primary object is to provide apparatus of simple and foolproof construction to permit the control of exothermic reactions conducted in a plurality of serially arranged catalyst beds.

Other objects and advantages of this invention will be apparent from the description which follows.

In accordance with this invention, the fluid reactants, preferably in the gaseous state, which react exothermically in the presence of a catalyst are passed through a plurality of beds of such catalyst arranged in series and a quenching or cooling fluid, which may be an additional quantity of the fluid reactants, is introduced between the successive catalyst beds under conditions ensuring intimate and thorough mixing of the quenching fluid with the fluid stream leaving each catalyst bed before it enters the succeeding catalyst bed. The temperature and quantity of the quenching fluid introduced between each pair of succeeding catalyst beds are adjusted so as to reduce the temperature of the fluid stream passing from one catalyst bed to the next succeeding catalyst bed to a temperature level at which it is desired to maintain the reaction. Pursuant to this invention intimate and thorough admixture of the stream leaving one catalyst bed and the quenching fluid is effected by bringing the two fluid streams together in a space separated from the catalyst beds and discharging the admixed fluids to the succeeding catalyst bed through a plurality of relatively small openings causing turbulence in the fluids passing therethrough.

For a clearer and more detailed understanding of the invention, reference is now made to the drawing forming a part of this specification, of which:

Figure 1 is an elevation in section of a reactor embodying this invention;

Figure 2 is an enlarged horizontal section through the reactor of Figure 1 taken along the line 2—2 with parts of the screen 21 and the underlying perforated plate 20 broken away to show the distributor 23 resting on perforated plate 22; and Figure 3 is an expanded partial view of the reactor of Figures 1 and 2 shown as a vertical section through line 3—3 of Figure 2.

Referring to Figure 1, reactor 10 comprises a substantially cylindrical vertical shell 11 having a conically expanded upper portion 12 terminating in flanged portion 12a. During normal operation, removable dome 13 is attached in fluid-sealed relation to shell 11 in a suitable manner as, for example, by welding flange 12a to flange 13a of said dome. The dome 13 has fluid inlet 14 and a plurality of ports 14a to house thermowalls 24a as will be explained below. Shell 11 terminates at the bottom in frusto-conical section 15 which in turn terminates in fluid outlet 16. The shell and dome are fabricated of metal of suitable thickness and composition to withstand the conditions encountered during the normal course of its operation.

Within shell 11 is a unitary frame 17 for forming and supporting a plurality of superimposed and spaced catalyst beds 19. The unitary frame 17 is made up of several upright elements 24 which hold a plurality of spaced, perforated plates 20, each of which plates provides the base for supporting a bed 19 of catalyst particles. The lowermost plate 20 of unitary frame 17 rests on brackets 18 at the base of shell 11 and, thus, frame 17 is held in position in reactor 10. It is generally advisable to place a metal screen 21 on each plate 20 to permit fluid passage but to prevent the passage of catalyst particles therethrough. Screens 21 specifically protect against catalyst particles clogging the foramina or openings of plates 20 as well as hold back fine particles that might otherwise drop through plates 20. Upturned lips 21a at the periphery of screens 21 illustrate a preferable construction to protect against catalyst seepage between these screens 21 and the shell 11. The lips, however, are obviously not necessary to the satisfactory operation of this invention as lipless screens may be fitted properly to the inner shell surface. In fact, in some cases especially where the catalyst particles are fairly coarse, the perforated plates 20 may be used without screens 21. The upright elements 24 also carry another set of perforated plates 22; there is one plate 22 below each plate 20 except usually the lowermost plate 20 and the spacing between one plate 20 and its adjacent plate 22 is small when compared with the spacing from one plate 20 to the next plate 20 in the unitary frame 17.

Some of the uprights 24 are in the form of hollow tubes 24a so that thermocouples or other means may be inserted for measuring temperatures at various levels in reactor 10. Tubes 24a used as thermo-wells are longer than the other uprights 24 of unitary frame 17 and project above hanger plate 28 and through openings 14a in dome 13. When the dome 13 is in place and the reactor is sealed for operation, thermo-well tubes 24a are sealed to openings 14a by welding or soldering as shown at 26. It is generally advisable to provide expansion means like a bellows in the portion of each thermo-well tube 24a extending from hanger plate 28 to dome 13 to relieve strains arising from thermal expansion and contraction. The upper portion of uprights 24 are connected to hanger plate 28 to which eye-bolt 29 is fastened. When the dome 13 is removed from reactor 10 and unions 35 of fluid feed tubes 36 are disconnected, a hoist can be attached to eye-bolt 29 and used to lift the unitary frame 17 with catalyst beds 19 out of the reactor 10.

Some of the tubes 24a are shorter than those used as thermo-wells and terminate at hanger plate 28. Each of the shorter tubes 24a is fitted with an inner tube 33 for supplying a quenching fluid between catalyst beds 19 as will be explained later. If desired, a stuffing box may be placed around each inner tube 33 in the vicinity of hanger plate 28 to ensure against the passage of fluids through the annular clearance between inner tube 33 and its surrounding tube 24a. Plate 28 has a plurality of large openings 28a to permit ready flow of fluid through this plate.

In the narrow space 25 between each plate 20 and its adjacent plate 22 there is a distributor 23 for uniformly introducing the quenching fluid into space 25. In the embodiment shown in the drawing, distributor 23 is formed of an outer tubular ring 23a and an inner ring 23b connected to each other by cross-tube 23c which in turn is connected to vertical tube 33 for supplying the quenching fluid to distributor 23. Tube 33 is fitted in a shorter tubular upright 24a and terminates beyond the upper end of upright 24a in a bend 34. A union 35 connects tube 33 with feed tube 36. The quenching fluid flowing down tube 33 discharges through a plurality of holes 31 in rings 23a and 23b of distributor 23 into space 25 between perforated plates 20 and 22. The quenching fluid thus injected into space 25 is admixed with the reaction fluid stream passing down through the catalyst bed 19 and perforated plate 20 immediately above the space 25 into which quenching fluid has been injected. The admixture continues to flow downwardly through perforated plate 22 into the next lower catalyst bed 19. It will be observed in Figure 3 that the quenching fluid flowing upwardly out of perforations 31 of distributor 23 is uniformly added to all parts of the reaction fluid stream passing downwardly through perforations 20a of plate 20. To complete the thoroughness of admixture of the reaction fluid stream and the quenching fluid, the combined stream is made to flow downwardly through the perforations 22a of plate 22 before the stream enters the next lower catalyst bed 19. The distributor 23 is supported by blocks 30 resting on plate 22; thus, the fluid stream may flow freely around distributor 23 into the perforations 22a.

In accordance with this invention, intimate and complete admixture of the reaction fluid stream and the quenching fluid brought together in space 25 is achieved by forcing the combined fluids through a multiplicity of small openings or foramina 22a with an appreciable pressure drop, usually a pressure drop of 2 pounds per square inch and greater. For this purpose, the total cross-sectional area of the openings 22a in plate 22 is made substantially smaller than the total cross-sectional area of the openings 20a in plate 20. In the reactor shown in the drawings, the openings 20a and 22a are of the same size but there are twice as many openings 20a as there are openings 22a. In many cases, it is advisable to make the total cross-sectional area of the openings 22a approximately one-half of the corresponding area of the openings 20a. The desired pressure drop across plate 22 is such that the fluids passing through perforations 22a are subjected to turbulent flow and thus are thoroughly admixed before they reach the catalyst bed 19 disposed below plate 22. Instead of using fewer openings 22a than openings 20a, the openings 22a may be made smaller in size than openings 20a to give the desired pressure drop across plate 22.

It will be noted that where a quench pipe 33 terminates in a distributor 23 the tubular upright 24a, in which pipe 33 is fitted, is interrupted, i. e., the upright 24a is cut away between plates 20 and 22. To prevent the flow of fluids through the empty portion of upright 24a into the discharge end 15 of reactor 10, a plug 32 may be welded or otherwise set in this empty portion of upright 24a as shown in Figure 3. Alternatively, the portion of upright 24a which is below the distributor 23 may be a solid rod. Conversely, solid uprights 24 which do not function as either thermo-wells or tubes for holding quench pipes 33 may be in the form of plugged tubes.

Utilizing apparatus such as illustrated by the drawings and described hereinbefore, simple and improved temperature control of an exothermic catalytic reaction is attained by intimate mixing of the quench and process fluids which are passed through the plurality of catalyst beds arranged in series. The distributors 23 serve to supply the quenching fluid uniformly to all portions of the reaction fluid stream as it flows through spaces 25 and the foraminous or perforated plates 22 complete the intimate admixture of these fluids by causing a high degree of turbulence in their flow therethrough.

The invention contemplates filling the serially arranged beds of unitary frame 17 with the desired particulate catalyst. The loading of the unitary frame 17 with catalyst particles is conveniently carried out by suspending frame 17 with a suitable hoist attached to eye-bolt 29 so that the lowermost perforated plate 20 is just below the conically expanded portion 12 of shell 11. The catalyst particles are poured onto the lowermost plate 20, which may have a screen 21 resting thereon, and the unitary frame 17 is gradually lowered into shell 11. When the desired height of catalyst has been built up on the lowermost plate 20 to form the lowermost catalyst bed 19, the charging of catalyst particles is interrupted and the frame 17 is lowered further into shell 11 so that the second lowermost plate 20 is just below expanded portion 12 of shell 11. As before, catalyst particles are poured onto this plate 20, while frame 17 is gradually lowered into shell 11, until the second lowermost catalyst bed 19 has been built up to the desired height. This operation is repeated until the several catalyst beds 19 of unitary frame 17 has been formed and the frame 17 has been brought into position by resting on brackets 18 at the bottom of shell 10. Thereupon, the unions 35 are closed so that feed pipes 36 are connected to the tubes 33 which are used for carrying the quench fluid to the several distributors 23 between the serially arranged catalyst beds 19. Dome 13 is fitted over the ends of tubes 24a which are used as thermowells and a seal is made along flanges 12a and 13a as well as around each of the tubes 24a as shown at 26 in Figure 1.

The reactor 10 after being charged with catalyst and sealed as described hereinbefore is ready for operation. The exothermically reactive fluid stream is admitted through inlet 14 and passes downwardly through the successive catalyst beds 19 while a quench fluid is supplied by way of feed pipe 36, pipe 33 and distributor 23 to each space 25 formed by the closely spaced perforated plates 20 and 22 beneath each catalyst bed 19. The reaction stream along with all of the quench fluid added thereto finally passes through the lowermost perforated plate 20 and is discharged from reactor 10 by way of outlet 16.

The exothermic reaction taking place in the presence of the particulate catalyst is thus controlled by regulating the temperature and rate of addition of the quench fluid. Depending upon the exothermicity of the catalytic reaction, the specific heat of the quench fluid and other obvious factors, the quantity of quench fluid used will vary between wide limits. Frequently, the volume of the quench fluid will fall in the range of about 20% to 100% of the volume of the fluid reactants.

When it becomes necessary to recharge reactor 10 with fresh catalyst, the spent catalyst may be taken out simply by removing dome 13, opening the pipe unions 35 and pulling unitary frame 17 out of shell 11 with a hoist attached to eye-bolt 29. As the frame 17 is withdrawn from shell 11, most of the catalyst will fall out of the frame since it has no lateral walls and any catalyst remaining on perforated plates 20 can be readily brushed off or otherwise removed therefrom. The cleaned frame 17 may then be recharged with fresh catalyst while it is being lowered into shell 11.

The present invention is particularly valuable in the catalytic synthesis of ammonia from hydrogen and nitrogen. This exothermic reaction is generally conducted at pressures of about 250 to 350 atmospheres, at temperatures in the range of about 800° to 1000° F. and in the presence of iron catalysts. A specific example of ammonia synthesis carried out in accordance with this invention follows.

*Example*

Unitary frame 17 holds six catalyst beds 19 having a total catalyst depth of 25 feet. Synthetic iron oxide promoted with small percentages of potassium oxide and alumina (as reported by Bridger et al. in Chemical Engineering Progress, June 1947, pages 291 to 302) is used as the catalyst. A pressure of about 300 atmospheres is maintained in reactor 10. The composition of the reactant stream entering inlet 14 of reactor 10 is as follows on a volume basis: nitrogen 21%, hydrogen 63%, ammonia 3%, methane 10% and argon 3%. This stream enters inlet 14 at a temperature of 770° F. To control the exothermic reaction, five streams of quenching fluid are introduced into the five spaces 25 between the six catalyst beds 19. The quenching fluid is of the same composition as the reactant stream passing through inlet 14 but its temperature is 100° F. For convenience, other operational data are presented in tabular form.

| Catalyst Bed Number | 1 (Top) | 2 | 3 | 4 | 5 | 6 (Bottom) |
|---|---|---|---|---|---|---|
| Temperature of gas stream entering bed ° F. | 770 | 920 | 900 | 890 | 880 | 870 |
| Temperature of gas stream leaving bed ° F. | 980 | 980 | 970 | 950 | 930 | 915 |
| Volume of quenching fluid added below bed percent | 13 | 11 | 10 | 8.7 | 8.4 | none |

The volumes of the five quenching streams are expressed as percentages of the volume of the reactant stream supplied through inlet 14; in other words, the total volume of the five quenching streams corresponds to 51.1% of the volume of the main gas stream flowing through inlet 14. The product stream discharging from outlet 16 contains 19% by volume of ammonia and is subjected to conventional treatment for the recovery of ammonia. Unreacted nitrogen and hydrogen issuing from the ammonia recovery system are added to a fresh stream of nitrogen and hydrogen and the resulting stream is the one which is supplied to reactor 10 and for which the composition has been given hereinabove.

In the example, the perforations 20a of plates 20 are $\frac{5}{16}$ inch in diameter and are on centers $\frac{3}{4}$ inch apart. The perforations 22a of plates 22 are also $\frac{5}{16}$ inch in diameter but are on centers $1\frac{1}{8}$ inches apart. Accordingly, each plate 20 has approximately twice as many perforations as each plate 22. The pressure drop across each plate 22 causes turbulence and consequent intimate mixing of the reaction stream and the added quench fluid passing through perforations 22a. The pressure drop across each plate 22 is approximately 3 pounds per square inch. Through this intimate admixture of the reaction stream and the quench fluid, the temperature of the exothermic reaction is satisfactorily controlled throughout reactor 10 and a high yield of ammonia is obtained.

Various modifications of the invention will occur to those skilled in the art upon consideration of the foregoing disclosure without departing from the spirit or scope thereof. Accordingly, only such limitations should be imposed as are indicated by the appended claims.

We claim:

1. In a reactor for effecting a reaction in a stream of fluid reactants by passage through a series of vertically spaced beds of particulate catalyst for said reaction wherein temperature control is maintained by injecting portions of a cooling medium into said stream while passing through the spaces between said vertically spaced catalyst beds, the improvement of a unitary, removable frame for supporting said vertically spaced catalyst beds and for supplying said cooling medium into said spaces which comprises a plurality of upright elements, a set of foraminous plates horizontally fastened by said upright elements in vertically spaced relation to one another to support said vertically spaced catalyst beds, a second set of foraminous plates horizontally fastened by said upright elements in vertically spaced relation to one another, one of said second set of plates being spaced closely below each of said first set of plates except the lowermost plate of said first set, a distributor for said cooling medium positioned between each plate of said first set and the plate of said second set spaced closely therebelow, and individual means for supplying said cooling medium through one of said upright elements to each said distributor.

2. The reactor of claim 1 wherein at least one of the upright elements is hollow and adapted to receive means for measuring temperatures in said reactor.

3. The reactor of claim 1 wherein the total cross-sectional area of the foramina of each plate of said second set is approximately one-half of the corresponding area of each plate of said first set.

4. A multiple catalyst bed reactor comprising, in combination, a substantially cylindrical and vertical shell, said shell being conically expanded at its upper terminus and conically contracted at its lower terminus to an outlet, a removable dome sealed to the upper shell terminus during operation, said dome having a feed inlet, and a removable, unitary frame fitted within said shell for holding a mass of particulate catalyst in a multiplicity of vertically spaced beds comprising a plurality of substantially vertical conduits, pairs of closely spaced foraminous plates horizontally and firmly attached to said vertical conduits at vertical distances at least equal to the desired depth of said vertically spaced beds of catalyst, a plurality of fluid-carrying conduits disposed within said vertical conduits and communicating with inlets outside said shell, and fluid distributors positioned in the spaces within said pairs of closely spaced foraminous plates and connected to said fluid-carrying conduits, in each of said pairs of closely spaced foraminous plates the lower plate having small foramina adapted to create turbulence in the fluid passing therethrough.

5. In a reactor for effecting a reaction in a stream of fluid reactants by passage through a series of vertically spaced beds of particulate catalyst for said reaction wherein temperature control is maintained by injecting portions of a cooling medium into said stream while passing through the spaces between said vertically spaced catalyst beds, the improvement of a unitary, removable frame for supporting said vertically spaced catalyst beds and for supplying said cooling medium into said spaces which comprises a plurality of upright elements, a plurality of foraminous plates horizontally fastened by said upright elements in vertically spaced relation to one another to support said vertically spaced catalyst beds, a distributor for said cooling medium positioned below each of said plates except the lowermost plate, and means for supplying said cooling medium through one of said upright elements to each said distributor.

ANDREW D. KORIN.
JOHN ROBELL.

REFERENCES CITED

The following references are of record in the file of this patent:

UNITED STATES PATENTS

| Number | Name | Date |
|---|---|---|
| 1,678,964 | Svanoe | July 31, 1928 |
| 1,767,780 | Urfer | June 24, 1930 |
| 1,927,493 | Hechenbleikner | Sept. 19, 1933 |
| 1,929,659 | Trumble et al. | Oct. 10, 1933 |
| 1,970,923 | Spalding | Aug. 21, 1934 |
| 2,104,858 | Ferguson | Jan. 11, 1938 |
| 2,256,622 | Murphree et al. | Sept. 23, 1941 |
| 2,388,451 | Tobiasson | Nov. 6, 1945 |
| 2,399,827 | Roach et al. | May 7, 1946 |
| 2,418,837 | Houdry | Apr. 15, 1947 |
| 2,452,569 | Houdry | Nov. 2, 1948 |